United States Patent
Koers et al.

(10) Patent No.: US 9,840,599 B2
(45) Date of Patent: Dec. 12, 2017

(54) PROCESS FOR CURING THERMOSET RESINS

(71) Applicant: Akzo Nobel Chemicals International B.V., Amersfoort (NL)

(72) Inventors: Frederik Willem Karel Koers, Epse (NL); Auke Gerardus Talma, Bathmen (NL)

(73) Assignee: AKZO NOBEL CHEMICALS INTERNATIONAL B.V., Arnhem (NL)

(*) Notice: Subject to any disclaimer, the term of this patent is extended or adjusted under 35 U.S.C. 154(b) by 72 days.

(21) Appl. No.: 14/421,381

(22) PCT Filed: Aug. 14, 2013

(86) PCT No.: PCT/EP2013/066952
§ 371 (c)(1),
(2) Date: Feb. 12, 2015

(87) PCT Pub. No.: WO2014/027008
PCT Pub. Date: Feb. 20, 2014

(65) Prior Publication Data
US 2015/0225515 A1   Aug. 13, 2015

Related U.S. Application Data

(60) Provisional application No. 61/693,821, filed on Aug. 28, 2012.

(30) Foreign Application Priority Data

Aug. 17, 2012  (EP) .................................... 12180828

(51) Int. Cl.
| C08J 3/24 | (2006.01) |
| C08F 283/01 | (2006.01) |
| C08K 5/14 | (2006.01) |
| C08K 5/17 | (2006.01) |
| C08K 5/29 | (2006.01) |

(52) U.S. Cl.
CPC ............. *C08J 3/247* (2013.01); *C08F 283/01* (2013.01); *C08K 5/14* (2013.01); *C08K 5/175* (2013.01); *C08K 5/29* (2013.01); *C08J 2335/02* (2013.01)

(58) Field of Classification Search
CPC .. C08K 5/14; C08K 5/175; C08K 5/29; C08F 283/01; C08J 2335/02
See application file for complete search history.

(56) References Cited

U.S. PATENT DOCUMENTS

| 3,645,908 A | 2/1972 | Edl et al. |
| 4,042,646 A | 8/1977 | Edamura et al. |
| 4,368,311 A | 1/1983 | Binder et al. |
| 2002/0137972 A1* | 9/2002 | Syed et al. .................... 568/304 |

FOREIGN PATENT DOCUMENTS

| DE | 2538013 A1 | 8/1975 |
| EP | 0038924 A2 | 3/1981 |
| EP | 0420133 A2 | 9/1990 |
| GB | 1000906 | 8/1965 |
| JP | S51-034985 | 9/1974 |
| WO | WO2008/003492 A1 | 1/2008 |
| WO | WO2008/003493 A1 | 1/2008 |
| WO | WO2008/003500 A1 | 1/2008 |

OTHER PUBLICATIONS

European Search Report for EP12180828.1 dated May 4, 2013.
European Search Report for EP12180827.3 dated Nov. 4, 2013.
International Search Report for PCT/EP2013/066952 dated Feb. 18, 2014.
International Search Report for PCT/EP2013/066951 dated Feb. 25, 2014.

* cited by examiner

*Primary Examiner* — Mark Kaucher
(74) *Attorney, Agent, or Firm* — McDonnell Boehnen Hulbert & Berghoff LLP

(57) ABSTRACT

Process for curing a thermoset resin comprising the step of contacting said resin with (i) an imine of the structure $C(R^2)(R^3)=N-R^1$ wherein $R^1$ is selected from hydrogen, hydroxyl, linear or branched alkyl having 1-22 carbon atoms, cycloalkyl having 3-22 carbon atoms, aryl having 6 to 15 carbon atoms, and aralkyl having 7 to 22 carbon atoms, which alkyl, cycloalkyl, aryl, and aralkyl groups may be optionally substituted with one or more groups containing heteroatoms selected from S, O, P, and/or Si. $R^2$ is selected from $C(R^6)(R^5)-C(=O)-R^4$, $-C(R^6)(R^5)-C(=S)-R^4$, and $-C(R^6)(R^5)-C(=N)-R^4$, wherein $R^4$, $R^5$, and $R^6$ are selected from hydrogen, linear or branched alkyl having 1-6 carbon atoms, cycloalkyl having 3-12 carbon atoms, aryl, aralkyl, alkoxy having 1-6 carbon atoms, and aryloxy. $R^3$ is selected from linear or branched alkyl having 1-22 carbon atoms, 1 cycloalkyl having 3-22 carbon atoms, aryl having 6 to 15 carbon atoms, and aralkyl having 7 to 22 carbon atoms, and (ii) methyl isopropyl ketone peroxide.

9 Claims, No Drawings

PROCESS FOR CURING THERMOSET RESINS

This application is a national stage filing under 35 U.S.C. §371 of PCT/EP2013/066952, filed Aug. 14, 2013, which claims priority to U.S. Provisional Patent Application No. 61/693,821 filed Aug. 28, 2012, and European Patent Application No. 12180828.1, filed Aug. 17, 2012, the contents of which are each incorporated herein by reference in their entireties.

The present invention relates to a process for curing thermoset resins. Such resins are conventionally cured using a redox system comprising an oxidizing agent (e.g. a peroxide) and a soluble transition metal ion complex as accelerator. The accelerator serves to increase the activity of the oxidizing agent at lower temperatures and, consequently, to speed up the curing rate.

Typical accelerators comprise a transition metal salt or complex. The most frequently used transition metal for this purpose is cobalt. However, legislation requires reduction of the amount of cobalt in view its toxicity.

As a result, there is a desire for the provision of Co-free accelerators. Examples of documents disclosing such Co-free accelerator systems are WO 2008/003492, WO 2008/003793, and WO 2008/003500. The metals used in the accelerator systems according to these documents—instead of Co—are Mn, Cu, Fe, and Ti.

It would, however, be even more desirable to provide a metal-free accelerator system.

Such a system has been described in the past, in U.S. Pat. No. 4,042,646, and uses a β-amino-α,β-unsaturated ketone as accelerator in combination with a peroxide containing a hydroperoxy (—OOH) group. Peroxides disclosed in said patent include ketone peroxides and hydroperoxides. Disclosed ketone peroxides are methyl ethyl ketone peroxide and methyl isobutyl ketone peroxide.

This accelerating system did, however, never find its way to commercial application. The reason is, most probably, that the performance is not satisfactory.

It has now been found that such metal-free systems can be further improved by the use of methyl isopropyl ketone peroxide.

The invention therefore relates to a process for curing thermoset resins comprising the step of contacting said resin with (i) an imine of the structure $C(R^2)(R^3)=N-R^1$ and (ii) methyl isopropyl ketone peroxide.

The imine to be used in the process of the present invention has the general formula $C(R^2)(R^3)=N-R^1$ wherein $R^1$ is selected from hydrogen, hydroxyl, linear or branched alkyl having 1-22 carbon atoms, cycloalkyl having 3-22 carbon atoms, aryl having 6 to 15 carbon atoms, and aralkyl having 7 to 22 carbon atoms, which alkyl, cycloalkyl, aryl, and aralkyl groups may be optionally substituted with one or more groups containing heteroatoms selected from S, O, P, and/or Si.

$R^2$ is selected from, $-C(R^6)(R^5)-C(=O)-R^4$, $-C(R^6)(R^5)-C(=S)-R^4$, and $-C(R^6)(R^5)-C(=N)-R^4$, wherein $R^4$, $R^5$, and $R^6$ are selected from hydrogen, linear or branched alkyl having 1-6 carbon atoms, cycloalkyl having 3-12 carbon atoms, aryl, aralkyl, alkoxy having 1-6 carbon atoms, and aryloxy.

$R^3$ is selected from linear or branched alkyl having 1-22 carbon atoms, cycloalkyl having 3-22 carbon atoms, aryl having 6 to 15 carbon atoms, and aralkyl having 7 to 22 carbon atoms.

In a preferred embodiment, an imine is used wherein $R^2$ is $-C(H)(R^5)-C(=O)-R^4$. More preferably, $R^2$ is $-CH_2-C(=O)-R^4$.

Even more preferred are imines wherein $R^4$ is alkoxy and $R^3$ is alkyl. Most preferred, $R^4$ is ethoxy and $R^3$ is methyl. These imines have the formula:

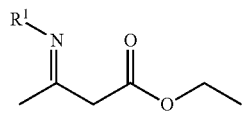

Preferred $R^1$ groups in the formula are n-propyl, isopropyl, n-butyl, t-butyl, t-amyl, and cyclohexyl, and hydroxyethyl.

Imines wherein $R^2$ is $-CH_2-C(=O)-R^4$ undergo ketimine-enamine and keto-enol tautomerism, according to the following formulae:

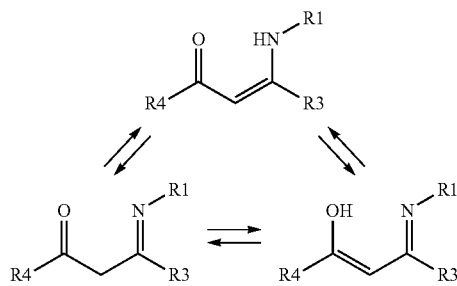

The synthesis of these preferred imines has been known for many years, and they are generally synthesized easily by reacting the corresponding β-diketone or β-ketoester with ammonia or a primary amine. As another process, they can also be obtained by reacting β-acetylenic ketone with ammonia, a primary amine, or a hydroxyl amine.

The imine is preferably be used in the process according to the invention in an amount of 0.01 to 10 parts by weight (pbw), more preferably 0.1 to 5 pbw, most preferably 0.5 to 2 pbw based on 100 parts by weight of resin.

The peroxide to be used in the process of the present invention is methyl isopropyl ketone peroxide. This peroxide can have the formula

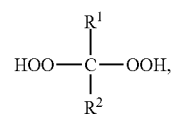

wherein $R^1$ is methyl and $R^2$ is isopropyl, or the formula

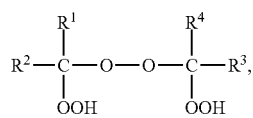

wherein $R^1$ and $R^4$ are methyl and $R^2$ and $R^3$ are isopropyl. The first formula reflects a so-called type-4 ketone peroxide; the second formula a so-called type-3 ketone peroxide. Both types are generally present in the peroxide formulation, in addition to hydrogen peroxide.

The peroxide is preferably used in the process of the present invention in an amount of 0.1 to 10 parts by weight (pbw), more preferably 0.5 to 5 pbw, most preferably 1-2 pbw, based on 100 parts by weight of resin.

Suitable thermoset resins to be cured in accordance with the process of the present invention include unsaturated polyester (UP) resins, vinyl ester resins, (meth)acrylate resins, polyurethanes, epoxy resins, and combinations thereof like combinations of UP resins and epoxy resins or combinations of different UP resins. Preferred resins are (meth)acrylate resins, UP resins and vinyl ester resins. In the context of the present application, the terms "unsaturated polyester resin" and "UP resin" refer to the combination of unsaturated polyester resin and ethylenically unsaturated monomeric compound. The term "(meth)acrylate resin" refers to the combination of acrylate or methacrylate resin and ethylenically unsaturated monomeric compound. UP resins and acrylate resins as defined above are common practice and commercially available.

Suitable UP resins to be cured by the process of the present invention are so-called ortho-resins, iso-resins, iso-npg resins, and dicyclopentadiene (DCPD) resins. Examples of such resins are maleic, fumaric, allylic, vinylic, and epoxy-type resins, bisphenol A resins, terephthalic resins, and hybrid resins.

Vinyl ester resins include acrylate resins, based on, e.g. methacrylate, diacrylate, dimethacrylate, and oligomers thereof.

Acrylate resins include acrylates, methacrylates, diacrylates and dimethacrylates, and oligomers thereof.

Unsaturated polyester or vinyl ester resin may contain a monomer. Examples of suitable monomers are ethylenically unsaturated monomeric compounds such as styrene and styrene derivatives like α-methyl styrene, vinyl toluene, indene, divinyl benzene, vinyl pyrrolidone, vinyl siloxane, vinyl caprolactam, stilbene, but also diallyl phthalate, dibenzylidene acetone, allyl benzene, methyl methacrylate, methylacrylate, (meth)acrylic acid, diacrylates, dimethacrylates, acrylamides; vinyl acetate, triallyl cyanurate, triallyl isocyanurate, allyl compounds which are used for optical application (such as (di)ethylene glycol diallyl carbonate), chlorostyrene, tert-butyl styrene, tert-butylacrylate, butanediol dimethacrylate and mixtures thereof. Suitable examples of (meth)acrylates reactive diluents are PEG200 di(meth) acrylate, 1,4-butanediol di(meth)acrylate, 1,3-butanediol di(meth)acrylate, 2,3-butanedioldi(meth)acrylate, 1,6-hexanediol di(meth)acrylate and its isomers, diethylenegylcol di(meth)acrylate, triethyleneglycol di(meth)acrylate, glycerol di(meth)acrylate, trimethylolpropane di(meth)acrylate, neopentyl glycol di(meth)acrylate, dipropyleneglycol di(meth)acrylate, tripropyleneglycol di(meth)acrylate, PPG250 di(meth)acrylate, tricyclodecane dimethylol di(meth)acrylate, 1,10-decanediol di(meth)acrylate, tetraethylene glycol di(meth)acrylate, trimethylolpropanetri(meth)acrylate, pentaerythritol tetra(meth)acrylate, glycidyl(meth) acrylate, (bis)maleimides, (bis)citraconimides, (bis)itaconimides, and mixtures thereof.

The amount of ethylenically unsaturated monomer in the resin is preferably at least 0.1 wt %, based on the weight of the unsaturated polyester or vinyl ester resin, more preferably at least 1 wt %, and most preferably at least 5 wt %. The amount of ethylenically unsaturated monomer is preferably not more than 50 wt %, more preferably not more than 40 wt %, and most preferably not more than 35 wt %.

The process according to the invention involves the step of contacting the peroxide and the imine with the resin. These compounds can be added to each other in any order.

In one embodiment, the resin can be pre-accelerated with the imine and curing is performed by adding the peroxide either quickly thereafter or days, weeks, or months later. It is also possible to add the peroxide and the imine (almost) simultaneously.

When the imine to be used is solid at room temperature, it is preferred to melt the imine or to dissolve it into a suitable solvent prior to its addition to the resin. Examples of suitable solvents are white spirit, diethylene glycol, propylene glycol, dibutyl phosphate, triethyl phosphate, methylethyl ketone, ethyl proxytol.

The peroxide is preferably added to the resin diluted in a suitable phlegmatizer. Phlegmatizers that can be used in these formulations are of the conventional type and are preferably selected from alkanols, cycloalkanols, alkylene glycols, alkylene glycol monoalkyl ethers, cyclic ether substituted alcohols, cyclic amides, esters, ketones, aromatic solvents, halogenated hydrocarbon solvents, and mixtures thereof.

Other compounds that may be present during the process of the invention are alkali or alkaline earth metal compounds, phosphorous-containing compounds, 1,3-diketones, nitrogen-containing bases, and reducing agents.

Examples of 1,3-diketones are acetyl acetone, benzoyl acetone, and dibenzoyl methane, and acetoacetates such as diethyl acetoacetamide, dimethyl acetoacetamide, dipropylacetoacetamide, dibutylacetoacetamide, methyl acetoacetate, ethyl acetoacetate, propyl acetoacetate, and butylacetoacetate.

Examples of alkali or alkaline metal compounds are alkali or alkaline metal carboxylate salts such as the 2-ethyl hexanoates, octanoates, nonanoates, heptanoates, neodecanoates, and naphthenates of alkali metals, and alkaline earth metals. A preferred alkali metal is K.

Examples of phorphorous-containing compounds are phosphorous compounds with the formulae $P(R)_3$ and $P(R)_3=O$, wherein each R is independently selected from hydrogen, alkyl with 1 to 10 carbon atoms, and alkoxy groups with 1 to 10 carbon atoms. Preferably, at least two R-groups are selected from either alkyl groups of alkoxy groups. Specific examples of suitable phosphorous-containing compounds are diethyl phosphate, dibutyl phosphate, tributyl phosphate, triethyl phosphate (TEP), dibutyl phosphite, and triethyl phosphate.

Examples of nitrogen-containing bases are tertiary amines like triethyl amine, dimethylaniline, diethylaniline, or N,N-dimethyl-p-toludine (DMPT), polyamines like 1,2-(dimethyl amine)ethane, secondary amines like diethyl amine, ethoxylated amines like triethanol amine, dimethylamino ethanol, diethanol amine, or monoethanol amine, and aromatic amines like bipyridine.

Examples of reducing agents are ascorbic acid, sodium formaldehyde sulphoxylate (SFS), reducing sugars like glucose and fructose, oxalic acid, phosphines, phosphites, organic or inorganic nitrites, organic or inorganic sulphites, organic or inorganic sulphides, mercaptanes, and aldehydes, and mixtures thereof. Ascorbic acid, which term in this specification includes L-ascorbic acid and D-isoascorbic acid, is the preferred reducing agent.

Optional additives that may be present in the radically curable composition according to the invention are fillers, fibres, pigments, radical inhibitors, fire retardants, and promoters.

In a preferred embodiment, the radically curable composition comprises a filler and/or a reinforcement fibre. Examples of reinforcement fibres are glass fibres, carbon fibres, aramid fibres (e.g. Twaron®), and natural fibers (e.g.

jute, kenaf, industrial hemp, flax (linen), ramie, etc.). Examples of fillers are quartz, sand, aluminium trihydroxide, magnesium hydroxide, chalk, calcium hydroxide, clays, titanium dioxide, and lime.

Fire retardants include both halogen-containing and phosphorous-containing fire retardants. Examples of radical inhibitors include 2-methoxyphenol, 4-methoxyphenol, 2,6-di-t-butyl-4-methylphenol, 2,6-di-t-butylphenol, 2,4,6-trimethylphenol, 2,4,6-tris-dimethylaminomethyl phenol, 4,4'-thio-bis(3-methyl-6-t-butylphenol), 4,4'-isopropylidene diphenol, 2,4-di-t-butylphenol, 6,6'-di-t-butyl-2,2'-methylene, di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (TEMPOL), 1-oxyl-2,2,6,6-tetramethylpiperidine-4-one (TEMPON), 1-oxyl-2,2,6,6-tetramethyl-4-carboxyl-piperidine (4-carboxy-TEMPO), 1-oxyl-2,2,5,5-tetramethylpyrrolidine, 1-oxyl-2,2,5,5-tetramethyl-3carboxylpyrrolidine (3-carboxy-PROXYL), aluminium-N-nitrosophenyl hydroxylamine, diethylhydroxylamine, phenothiazine, and combinations thereof.

Although it is possible add transition metal compounds, such as Co, Cu, Mn, V, or Fe-compounds to the resin, it is preferred to conduct the process of the invention in the absence of such compounds. If one or more of these metals would be present, then they are preferably present in an amount (calculated as metal) of 0.02 to 10 mmol/kg resin, more preferably 0.10 to 5 mmol/kg resin, and most preferably at least 0.25 to 2 mmol/kg resin.

When the resin, peroxide, and imine have been combined, these compounds are mixed and dispersed. The curing process can be carried out at any temperature from −15° C. up to 250° C. Preferably, it is carried out at ambient temperatures commonly used in applications such as hand lay-up, spray-up, filament winding, resin transfer moulding, coating (e.g. gelcoat and standard coatings), button production, centrifugal casting, corrugated sheets or flat panels, relining systems, kitchen sinks via pouring compounds, etc. However, it can also be used in SMC, BMC, pultrusion techniques, and the like, for which temperatures up to 180° C., more preferably up to 150° C., most preferably up to 100° C., are used.

The cured composition can be subjected to a post-cure treatment to further optimize the hardness. Such post-cure treatment is generally performed at a temperature in the range 40-180° C. for 30 min to 15 hours.

The cured compositions find use in various applications, including marine applications, chemical anchoring, roofing, construction, relining, pipes and tanks, flooring, windmill blades, laminates, etc.

EXAMPLES

The following materials were used in the examples below:
Palatal P6—an ortho phthalic acid-based unsaturated polyester resin (ex-DSM resins)
Butanox® P50—methyl isopropyl ketone peroxide (50 wt % in dimethylphthalate; ex-AkzoNobel)
Butanox® M50—methyl ethyl ketone peroxide with an active oxygen content of 8.9 wt % (50 wt % in dimethylphthalate; ex-AkzoNobel)
Trigonox® 233—methyl isobutyl ketone peroxide (50 wt % in isododecane; ex-AkzoNobel)
Imine 1—4-(n-butylamino)-3-pentene-2-one
Imine 2—ethyl-3-(n-butylamino)-2-butenoate
Imine 3—3-(n-butylamino)-N,N-diethyl-2-butenamide

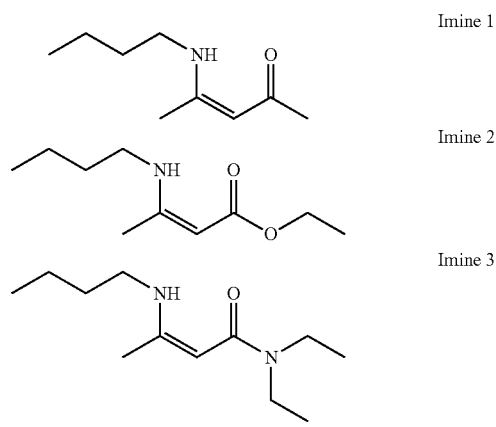

Curable compositions were prepared by mixing 100 phr resin, 1 phr accelerator, and 2 phr peroxide as listed in Tables 1-3. The accelerator was one of the imines listed above.

The compositions were allowed to cure at 20° C.

The cure of the compositions was analyzed by the method of the Society of Plastic Institure (analysis method F/77.1; available from Akzo Nobel Polymer Chemicals).

This method involves measuring of the peak exotherm, the time to peak, and the gel time.

According to this method, 20 g of a mixture comprising resin, peroxide, and accelerator were poured into a test tube and a thermocouple was placed through the enclosure at the centre of the tube. The glass tube was then placed in climate controlled room maintained at 20° C. and the time-temperature curve was measured. From the curve the following parameters were calculated:

Gel time (GT)=time in minutes elapsed between the start of the experiment and 5.5° C. above the bath temperature.

Time to peak exotherm (TTP)=time elapsed between the start of the experiment and the moment the peak exotherm was reached.

Peak Exotherm (PE)=the maximum temperature that was reached.

Shore D hardness was determined by standard method ASTM D2240.

Also the colour the final cured resin was evaluated.

The results are listed in Tables 1-3.

TABLE 1

| Accelerator: | Imine 1 | Imine 1 | Imine 1 |
|---|---|---|---|
| Peroxide | Butanox M50 | Butanox P-50 | Trigonox 233 |
| Gt [min · sec] | 11.27 | 9.28 | 18.50 |
| TTP [min · sec] | 35.12 | 25.05 | 38.34 |
| PE [° C.] | 44 | 114 | 35 |
| Shore D [48 h] | 65-70 | 70-75 | 35-40 |
| colour: | str. yellowish | str. yellowish | str. yellowish |

TABLE 2

| Accelerator:<br>Peroxide | Imine 2<br>Butanox M50 | Imine 2<br>Butanox P-50 | Imine 2<br>Trigonox 233 |
|---|---|---|---|
| Gt [min · sec] | 5.56 | 5.16 | 7.23 |
| TTP [min · sec] | 29.54 | 18.07 | 32.22 |
| PE [° C.] | 45 | 134 | 58 |
| Shore D [48 h] | 70-75 | 80-85 | 70-75 |
| colour: | blanco | yellowish | sl. yellowish |

TABLE 3

| Accelerator:<br>Peroxide | Imine 3<br>Butanox M50 | Imine 3<br>Butanox P-50 | Imine 3<br>Trigonox 233 |
|---|---|---|---|
| Gt [min · sec] | ca. 40 | 18.48 | ca. 30 |
| TTP [min · sec] | ca. 60 | 21.11 | ca. 53 |
| PE [° C.] | 24 | 46 | 27 |
| Shore D [48 h] | 40-45 | 55-60 | 60-65 |
| colour: | blanco | blanco | blanco |

These data show that the best curing behavior of these systems is obtained by using methyl isopropyl ketone peroxide compared to other ketone peroxides.

The invention claimed is:

1. A process for curing a thermoset resin comprising the step of contacting said resin with
   (i) an imine of the structure $C(R^2)(R^3)=N-R^1$ wherein $R^1$ is selected from the group consisting of hydrogen, hydroxyl, linear or branched alkyl having 1-22 carbon atoms, cycloalkyl having 3-22 carbon atoms, aryl having 6 to 15 carbon atoms, and aralkyl having 7 to 22 carbon atoms, said alkyl, cycloalkyl, aryl, and aralkyl groups may be optionally substituted with one or more groups containing heteroatoms selected from the group consisting of S, O, P, and Si,
   $R^2$ is selected from $C(R^6)(R^5)-C(=O)-R^4$, $-C(R^6)(R^5)-C(=S)-R^4$, and $-C(R^6)(R^5)-C(=N)-R4$, wherein $R^4$, $R^5$, and $R^6$ are selected from the group consisting of hydrogen, linear or branched alkyl having 1-6 carbon atoms, cycloalkyl having 3-12 carbon atoms, aryl, aralkyl, alkoxy having 1-6 carbon atoms, and aryloxy,
   $R^3$ is selected from the group consisting of linear or branched alkyl having 1-22 carbon atoms, cycloalkyl having 3-22 carbon atoms, aryl having 6 to 15 carbon atoms, and aralkyl having 7 to 22 carbon atoms, and
   (ii) methyl isopropyl ketone peroxide.

2. The process according to claim 1 wherein $R^2$ has the formula $-C(H)(R^5)-C(=O)-R^4$.

3. The process according to claim 1 wherein $R^5$ is hydrogen.

4. The process according to claim 1 wherein $R^4$ is an alkoxy group and $R^3$ is an alkyl group.

5. The process according to claim 4 wherein $R^4$ is an ethoxy group.

6. The process according to claim 4 wherein and $R^3$ is a methyl group.

7. The process according to claim 1 wherein $R^1$ is selected from the group consisting of n-propyl, isopropyl, n-butyl, t-butyl, t-amyl, and cyclohexyl, and hydroxyethyl.

8. The process according to claim 1 wherein said resin is contacted with said imine in an amount of 0.5 to 2 parts by weight of imine per 100 parts by weight of resin.

9. The process according to claim 1 wherein said resin is contacted with said methyl isopropyl ketone peroxide in an amount of 1 to 2 parts by weight of imine per 100 parts by weight of resin.

* * * * *